J. A. Lawson,

Pan Handle.

No. 96,122.    Patented Oct. 26, 1869.

Witnesses.
Charles D. Kellum
John P. Lamport

Inventor.
J. A. Lawson

United States Patent Office.

JAMES A. LAWSON, OF TROY, NEW YORK.

Letters Patent No. 96,122, dated October 26, 1869; antedated October 9, 1869.

IMPROVEMENT IN HANDLES FOR PANS AND OTHER COOKING-UTENSILS.

The Schedule referred to in these Letters Patent and making part of the same.

*To all whom it may concern:*

Be it known that I, JAMES A. LAWSON, of the city of Troy, in the county of Rensselaer, and State of New York, have invented a new and improved "Handle for Pans and other Cooking-Utensils;" and I do hereby declare the following to be a full, clear, and exact description of the same, reference being hereby had to the accompanying drawings, which form and make a part of this specification.

Like letters represent and refer to like or corresponding parts.

The nature of my said invention and improvements consists in making an ear or handle for pans and other similar cooking-utensils of wrought or malleable cast-iron, and pressed or stamped in any suitable form or shape, and more fully hereinafter described and set forth.

To enable others skilled in the art to which my invention relates, to make and use the same, I will here proceed to describe the construction and operation of the same, which is as follows, to wit:

In the accompanying drawings—

Figure 1:
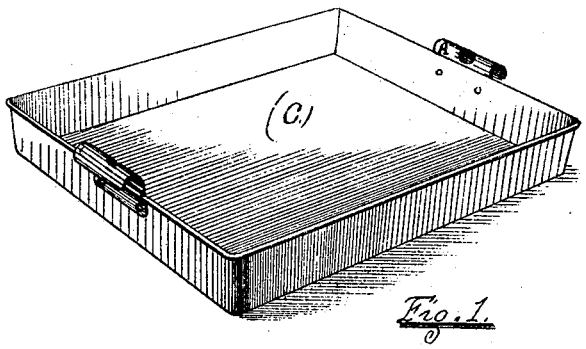
Figure 1 is a perspective view of an ordinary dripping-pan, having my improved handles attached thereto.
Figure 2:
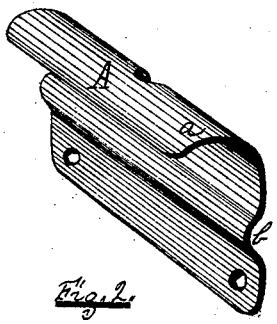
Figures 2 and 3 are perspective views, in different positions, of my said improved handle, more fully hereinafter described.
Figure 3:
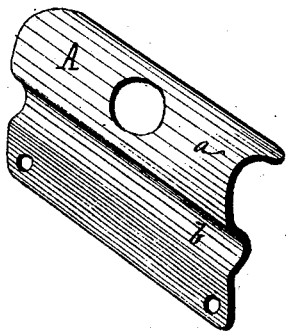

A, figs. 1, 2, and 3, represents my said improved handle, which I design to stamp from wrought or malleable cast-iron, having a suitable lip or ear, *a*, and groove *b*, which said groove *b* is for the purpose of enclosing the wire surrounding the top of the pan.

The said handle A may be of any size and shape deemed best, and is fastened to the pan C by rivets or bolts, as shown at fig. 1 in the accompanying drawings.

The style and shape of said handle may be varied according to the article to which it is desired to attach the same, and it is obvious it may be applied to cooking or other utensils besides pans of the description shown in the accompanying drawings.

The said handle or ear is stamped out by a machine for that purpose, in the ordinary way, and in the same, or substantially the same manner as the said pans C are stamped.

Having thus described the nature of my said invention and improvements,

What I claim as new, and as my invention, and desire to secure by Letters Patent of the United States, is as follows, to wit:

An ear or handle for pans or other similar or cooking-utensils, constructed from wrought or malleable cast-iron, and stamped, cast, or pressed in the form or shape substantially as herein described and set forth.

In testimony whereof, I have hereunto set my hand, this 26th day of October, 1868.

J. A. LAWSON.

Witnesses:
CHARLES D. KELLUM,
JOHN C. LAMPORT.